C. PLAGGE.
Rail-Guide for Wagons.
No. 70,259. Patented Oct. 29, 1867.
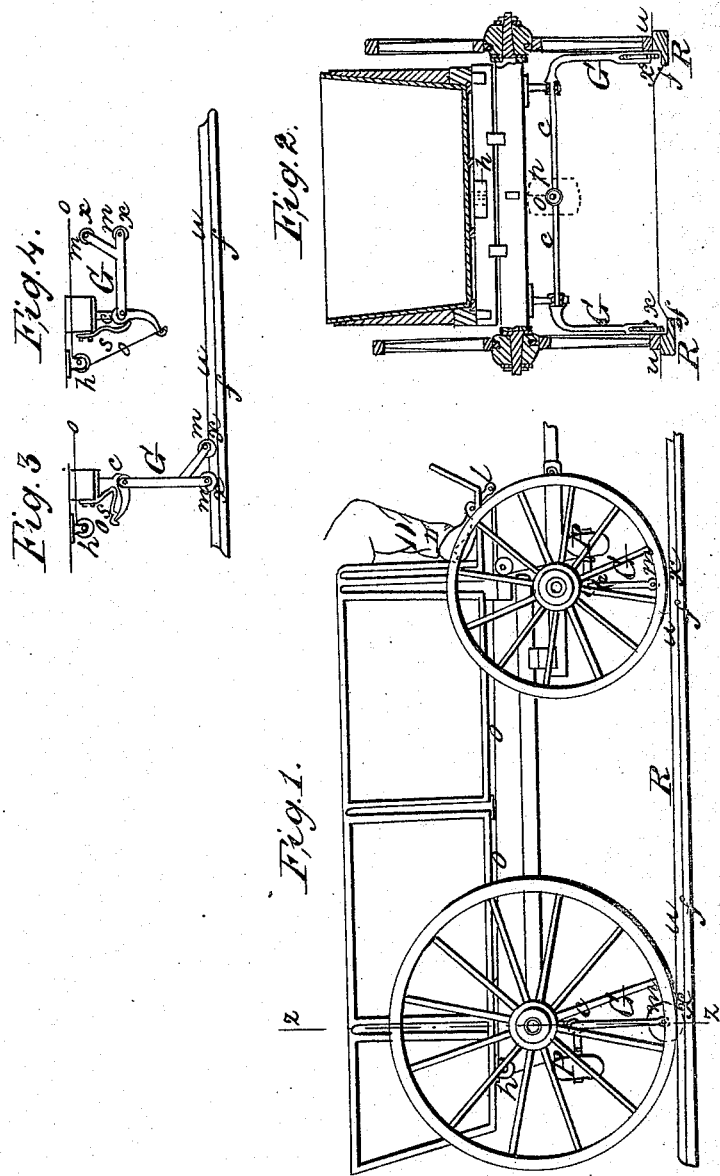

United States Patent Office.

CHARLES PLAGGE, OF DARMSTADT, GRAND DUCHY OF HESSE.

Letters Patent No. 70,259, dated October 29, 1867.

IMPROVED RAIL-GUIDE FOR GUIDING WAGONS.

*The Schedule referred to in these Letters Patent and making part of the same.*

TO ALL WHOM IT MAY CONCERN:

Be it known that I, CHARLES PLAGGE, of Darmstadt, Grand Duchy of Hesse, have invented a new and improved Movable Rail-Guide to enable wagons, carts, and other vehicles with ordinary plain wheels, as used on common roads or paved streets, to run on a rail-track with the same facility as rail-cars built specially for the purpose, and provided to that effect with regular railroad-wheels, having a projecting rim cast to its circumference to guide them on the track; and I do hereby declare that the following is a full and exact description thereof, reference being had to the accompanying drawings, and to the letters of reference marked thereon.

The nature of my invention consists in providing movable rail-guides G G to wagons, carts, and other vehicles used on common roads, which guides, when said vehicles run on a rail-track, are let down between the upper edges $u\, u$ and the foot $f\, f$ of the rails R R, thus preventing them from leaving the track as long as the guides are kept in this position. Should the wagon, cart, &c., leave the track, the rail-guides G G are raised from between the rails, so that the wagon, &c., can turn in any direction, as on a plain road, without any impediment.

To enable others skilled in the art to make and use my invention, I will proceed to describe its construction and operation.

I construct my wagons, carts, &c., in any of the known forms, regulating the length of their axles so that its wheels, when on a rail-track, will run, like railroad car-wheels, on the upper edges $u\, u$ of the rails forming the track. Below, and to each axle of the wagon or cart, I suspend the rail-guides G G, in such a way that, when the vehicle is on the rail-track R R, the extreme ends $x\, x$ of the guides G G (which, to lessen the friction, may have wheels attached to it, as shown in the drawing, $m\, m$,) come down between the upper edges $u\, u$ and the foot $f\, f$ of the rails opposite at and near the place where the wheels of the vehicle touch the upper sides $u$ of the rails. The rail-guides G G are kept in this position, as long as the wagon shall follow the rail-track, by means of the lever $l$, connected by pulleys $h\, h$ and wires $o\, o$ (or rods) with the rail-guides G G, which lever $l$ is worked by the foot of the driver D. As long as the latter bears his foot on the lever $l$ the ends $x\, x$ of the rail-guides G G are kept between the upper edges of the rails, and the wagon or cart cannot leave the rails. Should the wagon or cart get off the rails the driver has only to remove his foot from the lever $l$, when the counter-weights P P, attached to the connecting-rods of the rail-guides, throw the extreme ends of the guides above the track, and enable the wagon or cart to turn off in any direction desired, without any further impediment.

Instead of the counter-weights P P, springs S S, Figures 3 and 4, or any other known means, may be used to work the rail-guides, as described, which latter may likewise be shaped as shown in fig. 3 and fig. 4 of the drawing, or in any other known and desired form answering the purpose.

What I claim as my invention, and desire to secure by Letters Patent, is—

The application of rail-guides to wagons, carts, and other vehicles with plain wheels, as used on common roads or paved streets, made and applied substantially and for the purposes as herein described and set forth.

CHARLES PLAGGE.

Witnesses:
CHARLES WALTOR,
JAS. McKENNA.